United States Patent [19]

Rozema et al.

[11] Patent Number: 4,696,016
[45] Date of Patent: Sep. 22, 1987

[54] DIGITAL CLOCK RECOVERY CIRCUIT FOR RETURN TO ZERO DATA

[75] Inventors: John G. Rozema, Elmhurst; Kenneth A. Thompson, Lockport, both of Ill.

[73] Assignee: Rockwell International Corporation, El Segundo, Calif.

[21] Appl. No.: 914,688

[22] Filed: Oct. 2, 1986

[51] Int. Cl.<sup>4</sup> ............................................. H04L 7/02
[52] U.S. Cl. ...................................... 375/20; 375/110
[58] Field of Search ....................... 375/17, 20, 95, 110; 360/41, 51; 307/516, 527, 269

[56] References Cited

U.S. PATENT DOCUMENTS

| | | | |
|---|---|---|---|
| 3,108,265 | 10/1963 | Moe | 360/51 |
| 3,688,036 | 8/1972 | Bland | 375/20 |
| 4,282,601 | 8/1981 | Flora | 375/20 |

*Primary Examiner*—Benedict V. Safourek
*Attorney, Agent, or Firm*—C. B. Patti; V. L. Sewell; H. F. Hamann

[57] ABSTRACT

A digital clock recovery circuit is described which extracts the signal element timing from a return-to-zero data stream. A converter changes the bipolar digital data stream to at least one first return-to-zero data stream representing pulses in the bipolar digital data stream. In these streams, a logic one is typically represented by a pulse of undetermined width less than the bit period. A logic zero is typically represented by no pulse. A reference clock signal having a predetermined frequency is required by the circuitry. An edge detector detects the positive going edges of the pulses in the combined return-to-zero data stream, and generates load pulses to a counter which are synchronized to transitions of the reference clock signal. The counter receives the load pulses and utilizes reference clock signal to produce a recovered clock signal, skiping or repeating counter states to kepp the recovered clock signal aligned with the bipolar digital data stream.

11 Claims, 8 Drawing Figures

FIG. 2 DIGITAL CLOCK RECOVERY CIRCUIT

DIGITAL CLOCK RECOVERY CIRCUIT FOR RETURN TO ZERO DATA

BACKGROUND OF THE INVENTION

The present invention relates in general to digital clock recovery circuits and, in particular, to a digital clock recovery circuit for use with return-to-zero data streams.

Recovering clock pulses from a stream of return-to-zero data pulses is known in the prior art, but has typically been implemented with analog means such as ringing tanks and injection locked oscillators. These have required expensive factory adjustments to tune the circuits, and sensitivity to environmental changes such as temperature and humidity must be considered. Digital implementations in the prior art have not typically addressed return-to-zero data encoding, and have required a reference clock many times the basic data rate. In applications requiring data rates in the megabit per second range, it becomes impractical to provide a reference clock more than a few times the basic data rate.

The present invention overcomes these drawbacks in the prior art.

OBJECTS OF THE INVENTION

It is the general object of the present invention to provide an improved clock recovery circuit.

It is a further object of the present invention to provide a digital clock recovery circuit which can recover the clock signal from a return-to-zero data stream.

It is another object of the present invention to provide a clock recovery circuit which can be used with a bipolar alternate mark inverted digital data stream, such as the North American T1 digital signal.

SUMMARY OF THE INVENTION

The present invention relates to a data rate clock pulse recovery circuit for use with a bipolar digital data stream. A converter changes the bipolar digital data stream to a first return-to-zero data stream representing the positive going pulses in the bipolar digital data stream and to a second return-to-zero data stream representing the negative going pulses in the bipolar digital data stream. The first and second return-to-zero data streams are combined to form a combined return-to-zero data stream. In these streams, a logic one is typically represented by a pulse of undetermined width less than the bit period. A logic zero is typically represented by no pulse. A reference clock signal having a predetermined frequency is required by the circuitry. This clock source may be an internal integral part of the circuit, or may be an external separate circuit module. An edge detector detects the positive going edges of the pulses in the combined return-to-zero data stream, and generates load pulses to a counter which are synchronized to transitions of the reference clock signal. The counter counts reference clock transitions, beginning from the synchronized load pulses, and counting to the estimated time for a recovered clock transition. Estimated recovered clock transitions continue to be generated, until the next logic one data pulse occurs. The counter skips or repeats a state when the phase of the combined return-to-zero data stream drifts relative to the reference clock, thereby keeping the recovered clock signal aligned with the retimed first and second return-to-zero data streams. The retiming is performed by first and second retimers which receive the reference clock signal and the recovered clock signal, as well as both the first and second return-to-zero data streams, to produce corresponding retimed first and second non-return-to-zero data streams. The retimed first and second non-return-to-zero data streams are synchronized to the recovered clock signal.

BRIEF DESCRIPTION OF THE DRAWINGS

The features of the present invention which are believed to be novel are set forth with particularlity in the appended claims. The invention, together with further objects and advantages, may best be understood by reference to the following description taken in conjunction with the accompanying drawings, in the several figures of which like reference numerals indentify like elements, and in which:

Figure 8:
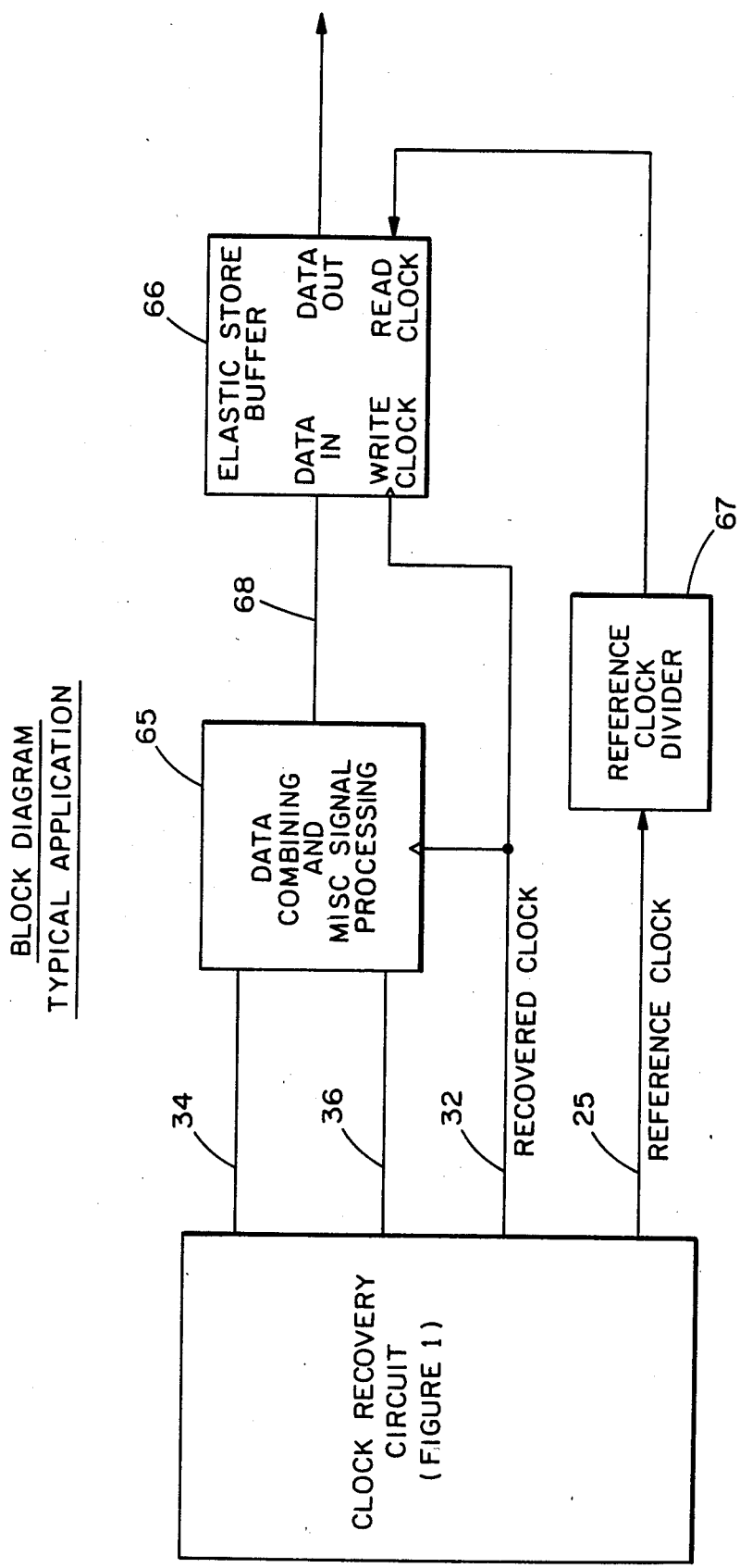

The preferred embodiment of the digital clock recovery circuit was used in an application shown in FIG. 8.

DESCRIPTION OF THE PREFERRED EMBODIMENT

Figure 1:
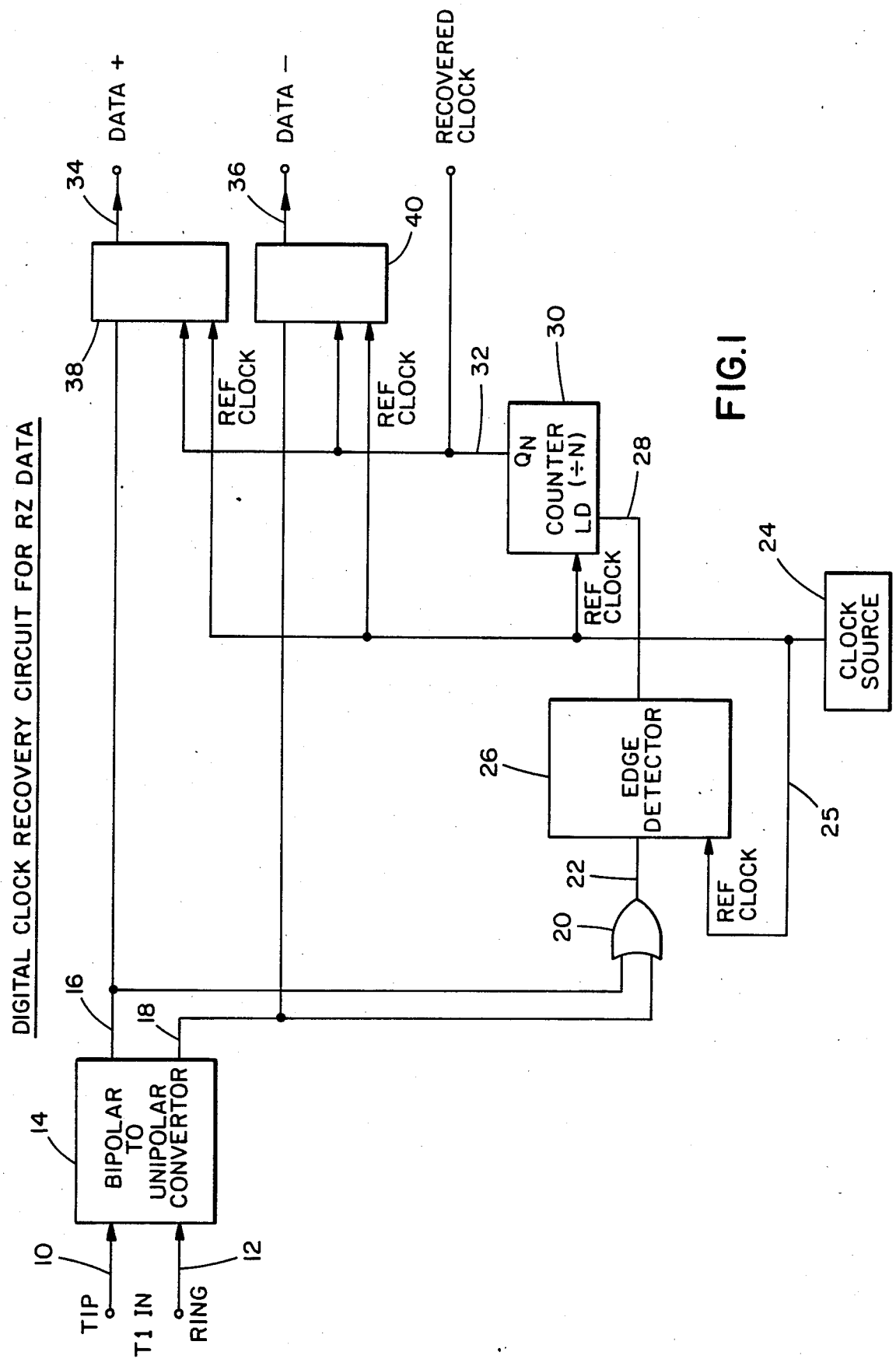
FIG. 1 is a general block diagram of the digital clock recovery circuit for use with return-to-zero data stream.

Whereas the invention may be implemented in various types of clock recovery circuits, it is preferably embodied in a circuit shown in general block diagram of FIG. 1. This circuit is used to recover the signal element timing (Recovered Clock) from the return-to-zero data pulses derived from a bipolar, alternate mark inverted digital T1 data stream. In the T1 environment, the two input lines 10 and 12 represent the tip and ring connections respectively of one T1 signal.

In general terms, and in reference to FIG. 1, the data rate clock pulse recovery circuit is used for interfacing with a bipolar digital data stream occurring on the T1 input, lines 10 and 12. A bipolar to unipolar converter 14 is provided for converting the bipolar digital data stream on lines 10 and 12 to a first return-to-zero data stream on line 16 representing the positive going pulses and the bipolar digital data stream. The bipolar to unipolar converter 14 also provides a second return-to-zero data stream on line 18 representing the negative going pulses in the bipolar digital data stream. The first and second return-to-zero data streams are combined by gate 20 to form a combined return-to-zero data stream on line 22. Gate 20 is not strictly necessary, as a satisfactory recovered clock 32 can be obtained with the edge detector 26 connected to one pulse data stream 16 or the other 18. However, in such a configuration, the clock recovery circuit can tolerate only half the number of consecutive, no pulse, logic zeros in the T1 signal 10, 12.

A reference clock source 24 having a predetermined pulse clock signal frequency is provided. In the preferred embodiment, the frequency of this reference was four times the data bit rate, and was frequency locked to the T1 signal 10, 12. However, in general, the reference clock frequency can be any value larger than the data bit rate, and frequency locking to the data stream is not required. An edge detector 26 detects the positive-going edge of a pulse of the combined return-to-zero data stream received on line 22, and generates a load pulse 28 to the counter 30. This load pulse is synchronized to the transitions of the reference clock signal 25. The edge detector 26 thereby produces an edge detected data stream on line 28. A counter 30 receives the edge-detected data stream on line 28 and utilizes the reference clock signal 25 to produce a recovered clock signal on line 32. The counter 30 skips or repeats a state when the phase of the combined return-to-zero data stream on line 22 drifts, thereby keeping the recovered clock signal 32 aligned with retimed first and second non-return-to-zero data streams appearing on lines 34 and 36. The pulse stretching and retiming circuits 38 and 40 are provided and receive the reference clock signal from the clock source 24 as well as the recovered clock signal 32. The first and second return-to-zero data streams on lines 16 and 18 respectively are fed through the retiming circuits 38 and 40 to provide a retimed first and second non-return-to-zero data streams 34 and 36, respectively, which are synchronized to the recovered clock signal.

Figure 3:
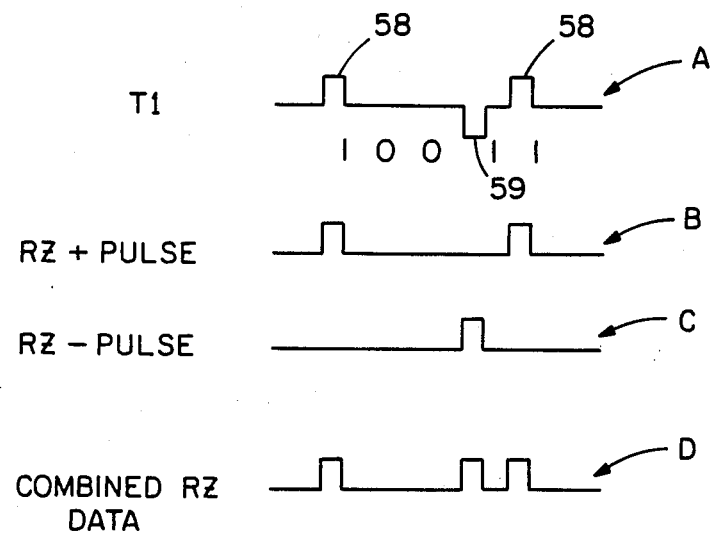
FIG. 3 is a timing diagram depicting an example of the digital waveform received by the circuit shown in FIG. 1, as well as the return-to-zero and combined return-to-zero data streams produced by the circuit.

FIG. 3 shows a representative example of the digital data stream received on the T1 line identified as A, and after the bipolar to unipolar conversion by 14, the pulses shown in B and C represent the return-to-zero data streams for the positive and negative going pulses in the T1 data stream (line 16 and 18 respectively). In signal A, line 10 positive with respect to line 12 is shown as a positive pulse 58, and line 10 negative with respect to 12 is shown as a negative inverted pulse 59. The combined return-to-zero data stream is shown at D in FIG. 3, and occurs on line 22 after the return-to-zero data streams as shown in B and C pass through gate 20.

In the preferred embodiment, the T1 bipolar digital data stream had a bit rate of 1.544 megabits per second and a bit period of 648 nanoseconds. In the T1 data stream, a pulse is nominally 320 nanoseconds wide at the T1 source. The pulse width at the output of the bipolar to unipolar converter 14 is a function of line length from the source, and the bipolar to unipolar converter circuitry. In the preferred embodiment, the pulse width was typically 270 nanoseconds.

Figure 2:
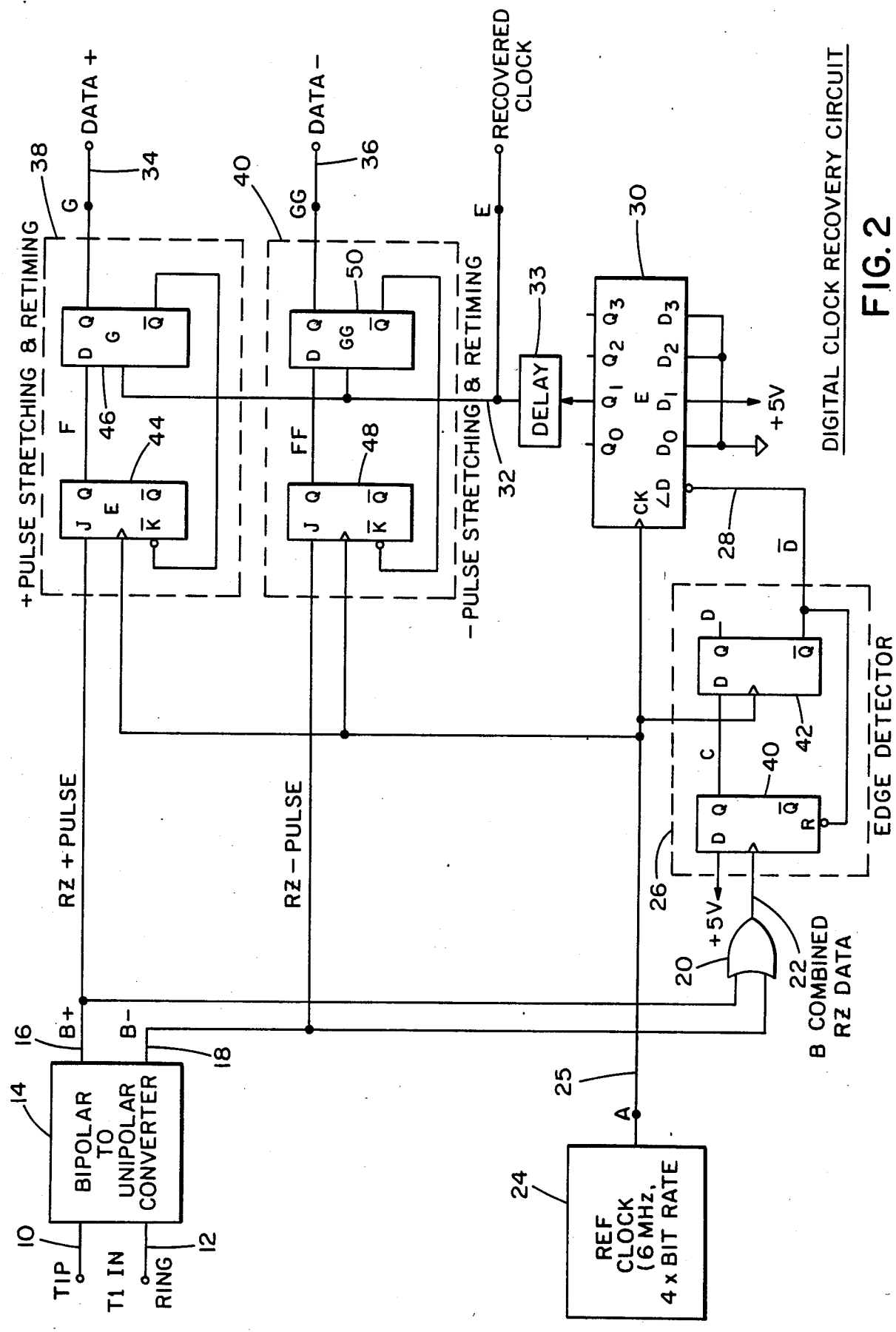
FIG. 2 is a more detailed schematic diagram of the FIG. 1 block diagram.

FIG. 2 shows a more detailed schematic diagram of the digital clock recovery circuit. As shown in FIG. 2, the edge detector 26 comprises a pair of flip-flops 40 and 42. A logic one level is clocked into flip-flop 40 by the positive edge of the combined data pulse 22. This is shown a signal C in FIG. 4. This logic level is sampled by flip-flop 42 at the next occurring rising transition of the reference clock signal 25, causing a predetermined value to be loaded into the counter 30, and resetting flip-flop 40. The reset of flip-flop 40 causes flip-flop 42 to sample a logic zero at the next following reference clock edge. The load signal 28 is thus a pulse which is in the active state for just one period of the reference clock signal 25. An active high version of this signal as shown as signal D in FIG. 4. For the preferred embodiment, the inverse active low signal was used.

Figure 4:
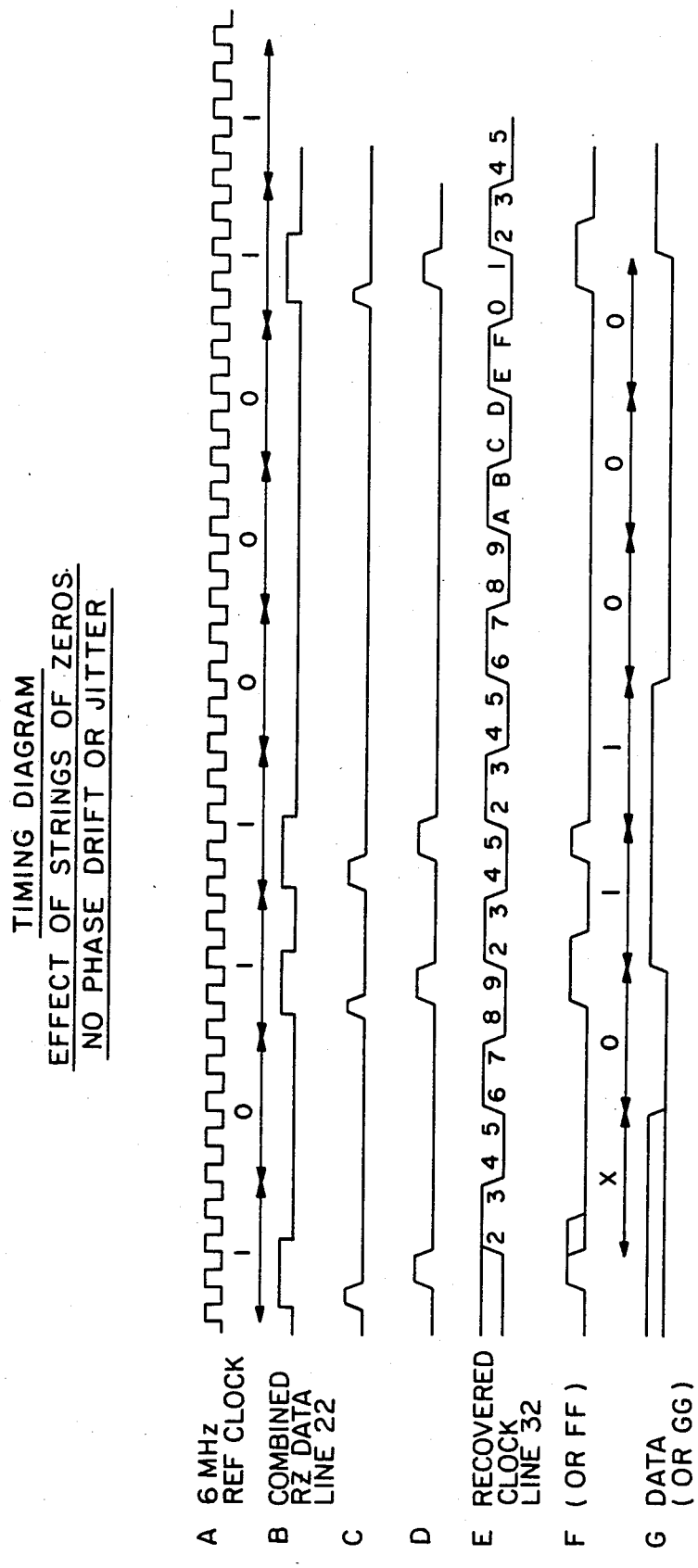
FIGS. 4, 5, and 6 are timing diagrams illustrating various digital waveforms within the circuit shown in FIG. 2, the FIG. 4 showing the waveforms when there is no phase shift present, and FIGS. 5 and 6 showing waveforms when there is a right and left phase shift present.

The value loaded into the counter 30 is determined so as to generate a transition on the recovered clock signal 32 at the appropriate time for clocking data into the pulse stretching and retiming circuits 38 and 40. The modulus of the counter 30 and the frequency of the reference clock signal 25 are chosen so that the reference clock frequency divided by the modulus is as close as possible to the bit rate of the data stream 22. Thus, as shown in FIG. 4, the clock recovery circuit is able to provide recovered clock pulses at the approximately correct intervals during strings of zeros, when no synchronizing data pulses occur. In order to maximize the number of consecutive zeros which may be tolerated, it is preferable that the nominal reference clock frequency be some integer multiple of the nominal bit rate, particularly when that multiple is a small number such as in the preferred embodiment.

In the preferred embodiment, the counter 30 was a binary up counter with synchronous load. That is, the load values at inputs D0, D1, D2, and D3, appeared at the outputs Q0, Q1, Q2, and Q3, if the LD input 28 was low when the rising edge of the reference clock 25 occurred. A four bit counter was used, although in fact a two bit counter would have been sufficient.

The first and second pulse stretching and retiming circuits 38 and 40 are shown as comprising a pair of flip-flops 44 and 46, and 48 and 50 respectively. In the application of the preferred embodiment, it was desirable to provide separate outputs 34 and 36 for the plus and minus pulse data streams, so that two separate pulse stretchers and retimers 38 and 40 were required. This may not be necessary in some applications, so that only a single pulse stretcher and retimer, e.g. 38, is required which is connected to the combined return-to-zero data stream 22 rather than the positive pulse data stream 16. Furthermore, the pulse stretching and retiming circuits 38 and 40 are not necessary to the generation of the recovered clock 32. Thus, if only the timing of the T1 line 10, 12 is of interest and not the data 34 and 36, then circuitry 38 and 40 need not be provided. In such a case, the recovered clock 32 is aligned only to the return to zero data pulses 16 or 18.

Figure 7:
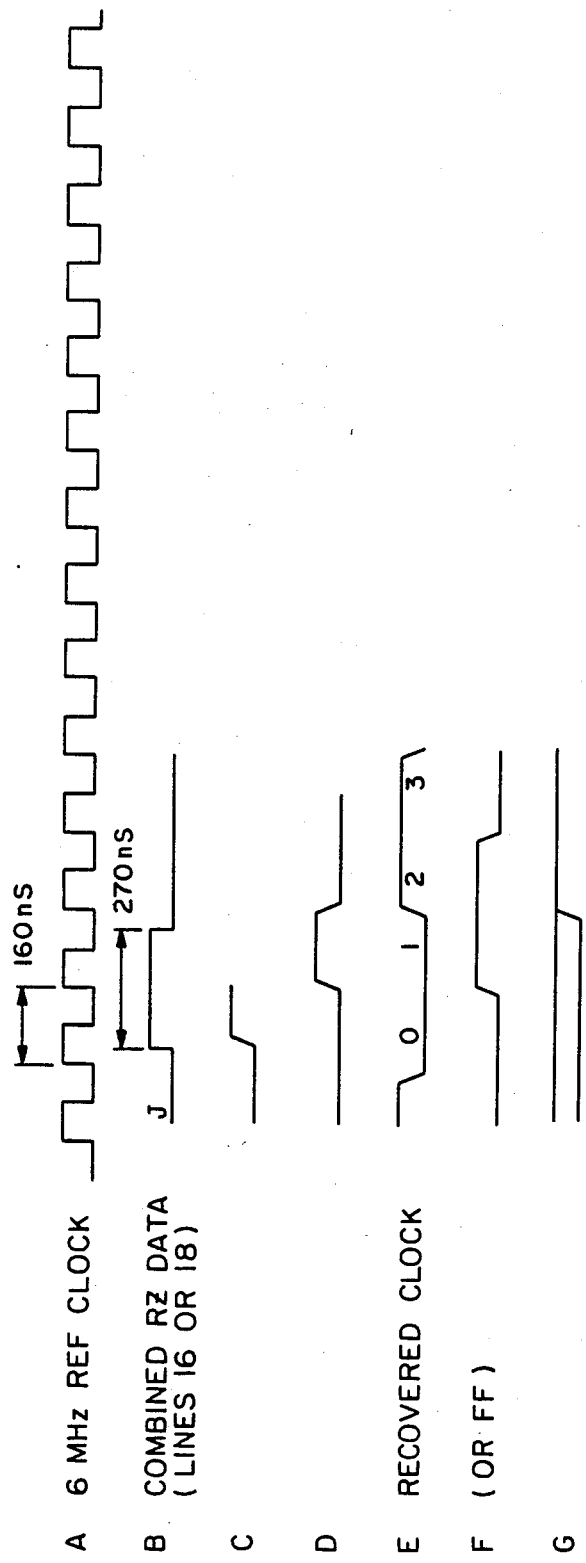
FIG. 7 is a timing diagram showing another example of digital waveforms within the FIG. 2 circuit detailing the retiming of the recovered data stream, and showing the effect of narrow width data pulses.

Since the operation of flip-flop 44 is identical to 48, and 46 is identical to 50, only 44 and 46 will be discussed. The purpose of flip-flop 44 is to guarantee that correct data is available at the D input to flip-flop 46 when the recovered clock transition (32) occurs. This is necessary when the data pulse width 16 is short. As shown in FIG. 7, it is possible for a narrow width data pulse to occur at a phase relative to the reference clock 25 such that only one edge of reference clock occurs during the pulse. Flip-flop 44 samples the data pulse 16 at the same instant that flip-flop 42 samples the occurrence of the data pulse from flip-flop 40. Flip-flop 46 then samples flip-flop 44 when the next rising edge of recovered clock 32 occurs, thereby providing non-return-to-zero (NRZ) data at 34 which is timed to the recovered clock 32.

Figure 5:
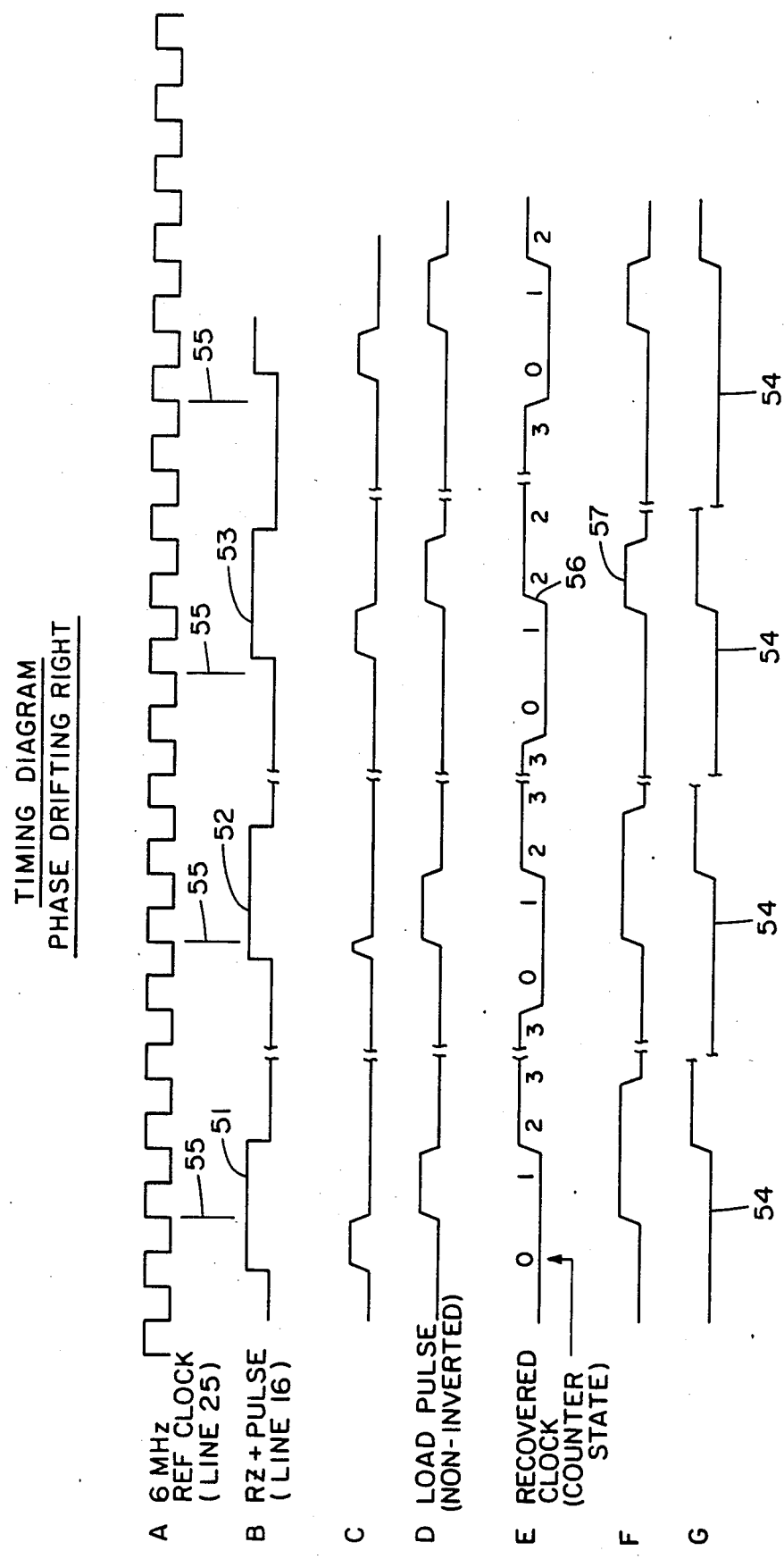
Figure 6:
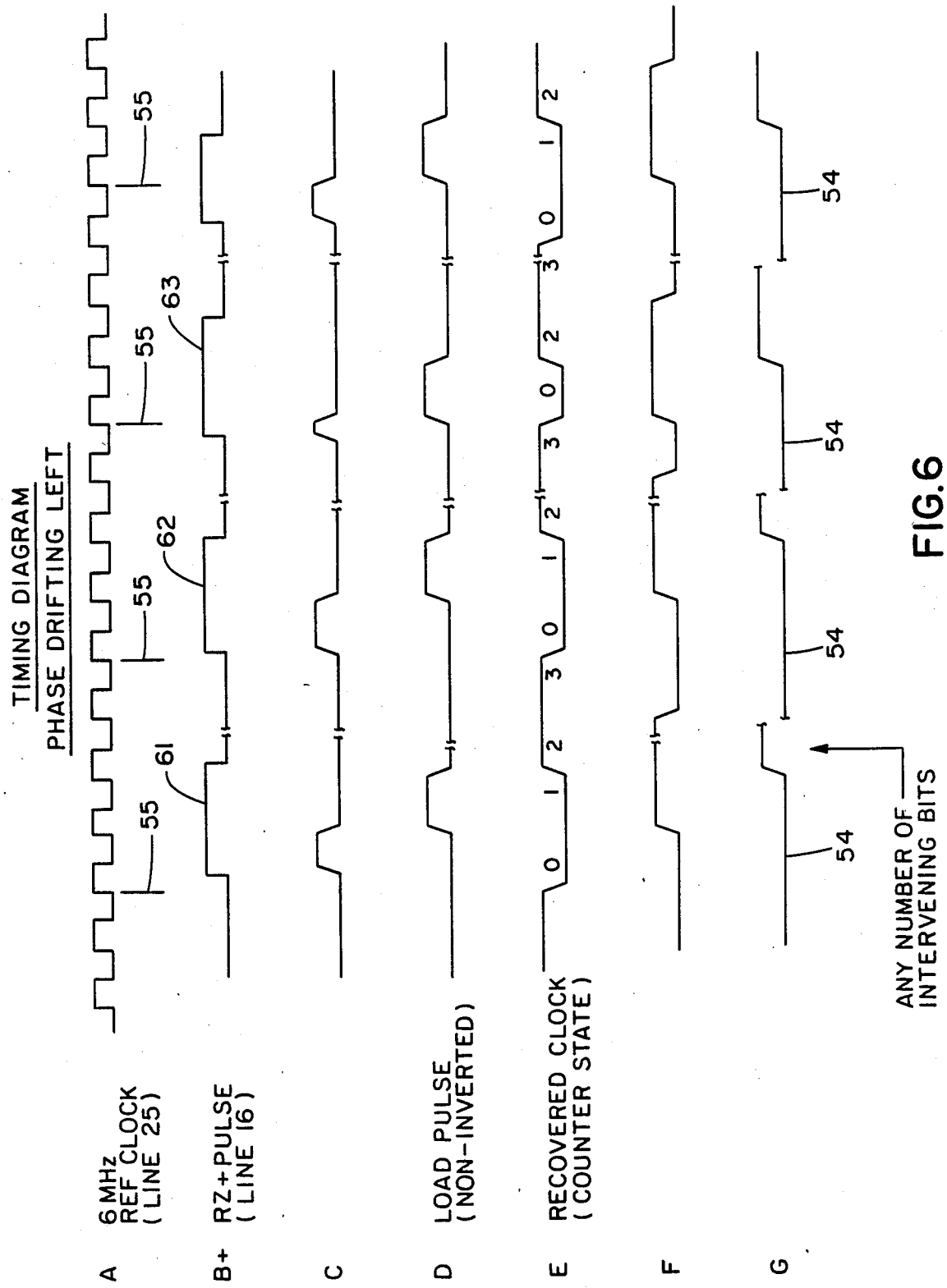

FIGS. 4, 5, and 6 are timing diagrams showing the relationship of the digital pulse data streams occurring at various nodes in the circuit as shown in FIG. 2. Data stream A is the reference clock signal which in the preferred embodiemnt was a 6.176 Megahertz clock signal four times the nominal data rate. Data stream B is the combined return-to-zero data stream, line 22. Data stream C is an internal node within the edge detector and data stream D represents the output of the edge detector. Signal E shows the recovered clock signal, line 32. Data streams F and G represent an internal and external data stream of the first retiming circuit 38. Nodes FF and GG as shown in FIG. 2, related to the second retiming circuit 40 are equivalent to the nodes F and G in the first retiming circuit 38. FIG. 4 shows the pulse data streams when no phase shift is present in the combined return-to-zero data stream. FIGS. 5 and 6 show the effect of the phase drifting to the right and left respectively.

The phase drive shown in FIGS. 5 and 6 can occur due to phase wander or jitter in the T1 signal, and also due to frequency differences between the reference clock 25 and the bit rate of the data stream 22. FIG. 5 shows three representative plus (+) data pulses, 51, 52 and 53, which occur on line 16. Intervening bit periods are not shown. Note that the bit period preceding RZ plus pulses 51, 52, or 53, cannot contain a pulse on line 16 due to the alternate mark inverted nature of the T1 line. That is, a preceding logic one should occur as a negative pulse, thereby appearing on line 18. To find otherwise is an error condition, which is not considered here. Therefore, the state 54 of signal G (line 34) is always logic zero at the beginning of the bit periods containing a pulse on line 16 (51, 52, 53).

The phase of data pulse 52 is delayed somewhat from the phase of data pulse 51, but has not crossed a boundary 55 defined by a rising edge transition of the reference clock A. Thus, the counter load pulse D occurs during state 1 of the counter 30, causing state 2 to occur in the next reference clock period. Since this is the next naturally occurring state in the counter sequence, the phase of the recovered clock E does not change.

Data pulse 53, however, is delayed sufficiently from 52 such that an extra reference clock occurs between data pulses 52 and 53. That is, if there are N intervening bits between 52 and 53, there are 4N+1 reference clock transitions rather than the usual 4N. Thus, the counter load pulse D occurs during state 2 of the counter 30, causing the counter to repeat state 2 in the next reference clock period, thereby delaying all subsequent recovered clock transitions, and correcting for the delayed data pulses B.

When the phase correction occurs, the recovered clock transition 56 must occur after signal F has achieved the logic one level 57. Otherwise, an incorrect logic zero will be clocked into flip-flop 46 (signal G). Therefore, the delay from signal A to E must be greater than the delay from A to F plus the set-up time requirements of flip-flop 46 (or 50). This was generally true for the particular devices used for flip-flop 44 and counter 30. However, in some cases it may be necessary to add delay in the recovered clock signal path using the delay element 33 shown in FIG. 2.

FIG. 6 shows the effects of the data pulses B+drifting left. The considerations are similar. Data pulse 62 occurs earlier than data pulse 61, but has not crossed a reference clock rising edge boundary 55, so there is no effect on the phase of the recovered clock E. However, data pulse 63 occurs sufficiently early so that there is one less reference clock edge between 62 and 63 (4N−1). Thus, the load pulse D occurs during state 0 of the counter, causing the next state to be 2, skipping state 1. Therefore, the phase of subsequent recovered clock pulses E is advanced by one reference clock period, compensating for the earlier arrival of the data pulses B.

The reference clock frequency chosen for the preferred embodiment was a clock signal which was four times the data bit rate, and which was frequency locked to the long term average bit rate of the T1 data stream. The clock source 24 was, in fact, a loop timing circuit typically found in digital telephony equipment. The objective of a loop timing circuit typically is to remove phase jitter from a T1 signal, thereby providing a smooth clock suitable for transmit T1 outputs. As such, the reference clock signal 25 in the preferred embodiment does not follow the instantaneous phase variations of the input T1, 10 and 12. Furthermore, the frequency of the preferred embodiment clock signal 25 may not be directly locked to the T1 line 10 and 12, but it may be indirectly locked through a diverse (alternate) path to some common frequency source which is also the determinate of the bit rate of the T1 line 10 and 12. Alternatively, the reference clock source 24 could be the common, master clock source to which the input T1 10 and 12 is timed.

In any case, an appropriately divided version of the preferred embodiment clock signal 25 is not suitable as the clock recovery signal 32. However, the frequency locked relationship between the input T1 line 10 and 12 and the reference clock 25 effectively eliminates any phase drift due to frequency offset between the data bit rate and reference clock frequency. Thus the only source of drift is short term phase variations or jitter of the T1 line itself.

Notice that discrete phase jumps occur as the clock recovery circuit corrects accumulated phase drift. In the preferred embodiment, using a readily available looped timed clock source 24, this could occur whenever the input jitter amplitude exceeds the period of one reference clock period, or whenever small amplitude jitter occurs across the boundary 55. In some applications this may be objectionable. In the particular application which used the preferred embodiment, this jitter was not objectionable because a downstream elastic store buffer effectively removed the jitter. This is shown in FIG. 8. Effectively, the retimed data 34 and 36 was combined as line 68 and clocked into an elastic buffer 66 by the recovered clock signal 32, and clocked out by a clock signal appropriately divided down from the smooth, frequency locked reference clock signal 25 by reference clock divider 67. Downstream signal processing circuitry performed a combining function 65, combining the Plus Data 34 and Minus Data 36 signals into a combined data stream 68. In actual fact, the combining could be provided as a separate standalone function, or as part of the elastic store 66, or the Plus Data 36 and Minus Data 38 signals could be carried separately through the elastic store.

What is claimed is:

1. A data-rate clock pulse recovery circuit for use with a bipolar digital data stream comprising:
   means for providing a refernce clock signal having a predetermined frequency;
   means for converting the bipolar data stream to a first return-to-zero data stream representing the positive going pulses in the bipolar data stream and to a second return-to-zero data stream representing the negative pulses in the bipolar data stream;
   means for combining said first and second return-to-zero data streams to form a combined return-to-zero data stream;
   means for detecting the next positive going edge of said reference clock signal after detecting the positive going edge of the pulse of said combined return-to-zero data stream, said means for detecting, receiving said combined return-to-zero data stream and said reference clock signal and producing an edge detected data stream;

means for counting, receiving said edge detected data stream and said reference clock signal to produce a recovered clock signal;

wherein said means for counting skips or repeats a state when the phase of said combined return-to-zero data stream drifts.

2. The apparatus defined in claim 1 wherein said data-rate clock pulse recovery circuit further comprises:

means for providing a predetermined time delay connected to an output of said means for counting to produce a time-delayed recovered clock signal.

3. The apparatus defined in claim 1 wherein said data-rate clock pulse recovery circuit further comprises:

first means for retiming receiving said reference clock signal, said recovered clock signal and said first return-to-zero data stream to produce a retimed first non-return-to-zero data stream which is synchronized to said recovered clock signal and wherein said data-rate clock pulse recovery circuit also comprises second means for retiming receiving said pulse clock signal, said recovered clock signal and said second return-to-zero data stream to produce a retimed second non-return-to-zero data stream which is synchronized to said recovered clock signal.

4. A data-rate clock pulse recovery circuit for use with a bipolar digital data stream comprising:

means for converting a bipolar digital data stream to a first return-to-zero data stream representing the positive going pulses in the bipolar digital data stream and to a second return-to-zero data stream representing the negative pulses in the bipolar digital data stream;

means for providing a reference clock signal having predetermined frequency;

means for combining said first and second return-to-zero data streams to form a combined return-to-zero data stream;

means for detecting the next positive going edge of said reference clock signal after detecting the positive going edge of a pulse of said combined return-to-zero data stream, said means for detecting, receiving said combined return-to-zero data stream and said reference clock signal and producing an edge detected data stream;

means for counting receiving said edge detected data stream and said pulse clock signal to produce a recovered clock signal;

first means for retiming, receiving said reference clock signal, said recovered clock signal and said first return-to-zero data stream to produce a retimed first non-return-to-zero data stream which is synchronized to said recovered clock signal; and second means for retiming receiving said reference clock signal, said recovered clock signal and said second return-to-zero data stream to produce a retimed second non-return-to-zero data stream which is synchronized to said recovered clock signal wherein said means for counting skips or repeats a state when the phase of said combined return-to-zero data stream drifts thereby keeping said recovered clock signal aligned with said retained retimed first and second non-return-to-zero data streams.

5. The apparatus described in claim 4 wherein said data-rate clock pulse recovery circuit further comprises means for providing predetermined timed delay connected to an output of said means for counting to produce a time-delayed recovered clock signal.

6. A method of providing data-rate clock pulse recovery for use with a bipolar digital data stream comprising:

converting the bipolar digital data stream to a first return-to-zero data stream representing the positive going pulses in the bipolar digital data stream and to a second return-to-zero data stream representing the negative pulses in the bipolar digital data stream;

providing a reference clock signal having a predetermined frequency;

combining said first and second return-to-zero data streams to form a combined return-to-zero data stream;

detecting the next positive going edge of said reference clock signal after detecting the positive going edge of a pulse of said combined return-to-zero data stream, said means for detecting receiving said combined return-to-zero data stream and said reference clock signal producing an edge detected data stream; and counting said received edge detected data stream in said pulse clock signal to produce a recovered clock signal wherein said counting skips ro repeats a state when the phase of said combined return-to-zero data stream drifts.

7. The method defined in claim 6 wherein said method further comprises providing a predetermined time delay to said recovered clock signal to produce a time-delayed recovered clock signal.

8. The method defined in claim 6 wherein said method further comprises retiming said reference clock signal, said recovered clock signal and said first return-to-zero data stream to produce a retimed first non-return-to-zero data stream which is synchronized to said recovered clock signal.

9. The method defined in claim 6 wherein said method further comprises retiming said reference clock signal, said recovered clock signal and said second return-to-zero data stream to produce a retimed second non-return-to-zero data stream which is synchronized to said recovered clock signal.

10. A data-rate clock pulse recovery circuit for use with a bipolar digital data stream comprising:

means for providing a reference clock signal having a predetermined frequency;

means for converting the bipolar data stream to at least one return-to-zero data stream representing the pulses in the bipolar data stream;

means for detecting the next positive going edge of said reference clock signal after detecting a positive going edge of the pulse of said return-to-zero data stream, said means for detecting, receiving said return-to-zero data stream and said reference clock signal and producing an edge detected data stream; and means for counting, receiving said edge detected data stream and said reference clock signal to produce a recovered clock signal;

wherein said means for counting skips or repeats a state when the phase of said return-to-zero data stream drifts.

11. The apparatus defined in claim 10 wherein said data rate clock pulse recovery circuit further comprises: at least one means for retiming, receiving said reference clock signal, said recovered clock signal and said return-to-zero data stream to produce a retimed non-return-to-zero data stream which is synchronized to said recovered clock signal.

* * * * *